United States Patent
Light-Holets et al.

(10) Patent No.: US 11,447,124 B2
(45) Date of Patent: Sep. 20, 2022

(54) SYSTEMS AND METHODS FOR ADJUSTING ENGINE OPERATING POINTS BASED ON EMISSIONS SENSOR FEEDBACK

(71) Applicant: Cummins Inc., Columbus, IN (US)

(72) Inventors: Jennifer Kay Light-Holets, Greenwood, IN (US); Xing Jin, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/248,101

(22) Filed: Jan. 8, 2021

(65) Prior Publication Data
US 2022/0219674 A1 Jul. 14, 2022

(51) Int. Cl.
*B60W 20/16* (2016.01)
*B60W 10/06* (2006.01)
*B60W 10/08* (2006.01)

(52) U.S. Cl.
CPC ............ *B60W 20/16* (2016.01); *B60W 10/06* (2013.01); *B60W 10/08* (2013.01); *B60W 2400/00* (2013.01); *B60W 2510/068* (2013.01); *B60W 2710/081* (2013.01); *B60W 2710/083* (2013.01); *B60Y 2200/92* (2013.01)

(58) Field of Classification Search
CPC ............................... B60W 10/06; B60W 10/08
See application file for complete search history.

(56) References Cited

U.S. PATENT DOCUMENTS

| | | | |
|---|---|---|---|
| 7,349,797 B2 | 3/2008 | Donnelly et al. | |
| 7,395,659 B2 * | 7/2008 | Pott | B60K 6/48 60/285 |
| 8,360,040 B2 | 1/2013 | Stewart et al. | |
| 10,035,511 B2 | 7/2018 | Light-Holets et al. | |
| 10,060,368 B2 * | 8/2018 | Pirjaberi | F02D 41/1498 |
| 10,309,281 B2 * | 6/2019 | Stewart | F02D 41/266 |

* cited by examiner

*Primary Examiner* — Derek D Knight
(74) *Attorney, Agent, or Firm* — Foley & Lardner LLP

(57) ABSTRACT

A method is provided for reducing emissions from a hybrid vehicle having an exhaust aftertreatment system. The method includes: receiving, by a controller, emissions data regarding an emissions level of a hybrid vehicle having an exhaust aftertreatment system from a sensor; determining, by the controller, that the emissions level is at or above a predefined threshold; adjusting, by the controller, an operating point of an engine of the hybrid vehicle based on the emissions level being at or above the predefined threshold; and controlling, by the controller, an elector motor in response to the adjustment of the operating point of the engine to compensate for a change in power output from the engine and to reduce the emissions level to below the predefined threshold.

18 Claims, 4 Drawing Sheets

SYSTEMS AND METHODS FOR ADJUSTING ENGINE OPERATING POINTS BASED ON EMISSIONS SENSOR FEEDBACK

TECHNICAL FIELD

The present disclosure relates to managing emissions by adjusting operating points for an engine and/or a motor/generator for a vehicle based on an emissions sensor(s) feedback to control/manage emissions from the vehicle.

BACKGROUND

In a vehicle, the powertrain or powertrain system refers to the components that provide the power to propel the vehicle. These components include the engine, transmission, drive/propeller shaft, differentials, and final drive. In operation and for an internal combustion engine, the engine combusts a fuel to generate mechanical power in the form of a rotating crankshaft. The transmission receives the rotating crankshaft and manipulates the engine speed (i.e., the rotation of the crankshaft) to control a rotational speed of the drive/propeller shaft, which is also coupled to the transmission. The rotating drive shaft is received by a differential, which transmits the rotational power to a final drive (e.g., wheels) to cause a movement of the vehicle.

In regards to a hybrid vehicle, conventional hybrid engine systems generally include both an electric motor or motor(s) and an internal combustion engine that function to provide power to the drivetrain in order to propel the vehicle. A hybrid vehicle can have various configurations. For example, in a parallel configuration, both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor (examples include extended range electric vehicles or range-extended electric vehicles).

Some vehicles further include an exhaust aftertreatment system configured to mitigate emissions from the vehicle (e.g., reduce harmful exhaust gas emissions (e.g., nitrous oxides (NOx), sulfur oxides, particulate matter, etc.). In operation and, for example, a reductant may be injected into the exhaust stream to chemically bind to particles in the exhaust gas. This mixture interacts with a catalyst that, at certain temperatures, causes a reaction in the mixture that converts the harmful emissions into less harmful emissions (e.g., nitrous oxide (NOx) particles into nitrogen and water). However, due to fault conditions in both the engine and aftertreatment systems, along with aging of various components within those systems, emissions of harmful gases may not always be controlled as desired.

SUMMARY

One embodiment relates to a system including an exhaust aftertreatment system coupled to an engine, at least one sensor coupled to the aftertreatment system, and a controller having at least one processor coupled to at least one memory device storing instructions that, when executed by the at least one processor, cause the controller to perform various operations. The operations include receiving emissions data from the at least one sensor regarding exhaust gas from the engine; determining that an emissions level is at or above a predefined threshold based on the received emissions data; adjusting an operating point of the engine in response to the emissions level being at or above the predefined threshold to reduce the emissions level; and controlling an electric motor in response to the adjustment of the engine to compensate for a change in power output from the engine to assist in reducing the emissions level to below the predefined threshold.

Another embodiment relates to a system for a hybrid vehicle. The system includes a controller coupled to an electrified powertrain and to at least one sensor disposed in an exhaust aftertreatment system of the hybrid vehicle. The controller is structured to: receive emissions data from the at least one sensor regarding exhaust gas from an engine; determine that an emissions level is at or above a predefined threshold based on the received emissions data; adjust an operating point of an engine of the electrified powertrain in response to the emissions level being at or above the predefined threshold; and control an electric motor of the electrified powertrain in response to the adjustment of the engine to compensate for a change in power output from the engine to reduce the emissions level to below the predefined threshold.

Another embodiment relates to a method. The method is structured to reduce emissions from a hybrid vehicle having an exhaust aftertreatment system. The method includes: receiving, by a controller, emissions data regarding an emissions level of a hybrid vehicle having an exhaust aftertreatment system from a sensor; determining, by the controller, that the emissions level is at or above a predefined threshold; adjusting, by the controller, an operating point of an engine of the hybrid vehicle based on the emissions level being at or above the predefined threshold; and controlling, by the controller, an elector motor in response to the adjustment of the operating point of the engine to compensate for a change in power output from the engine and to reduce the emissions level to below the predefined threshold.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements.

DETAILED DESCRIPTION

Figure 1:
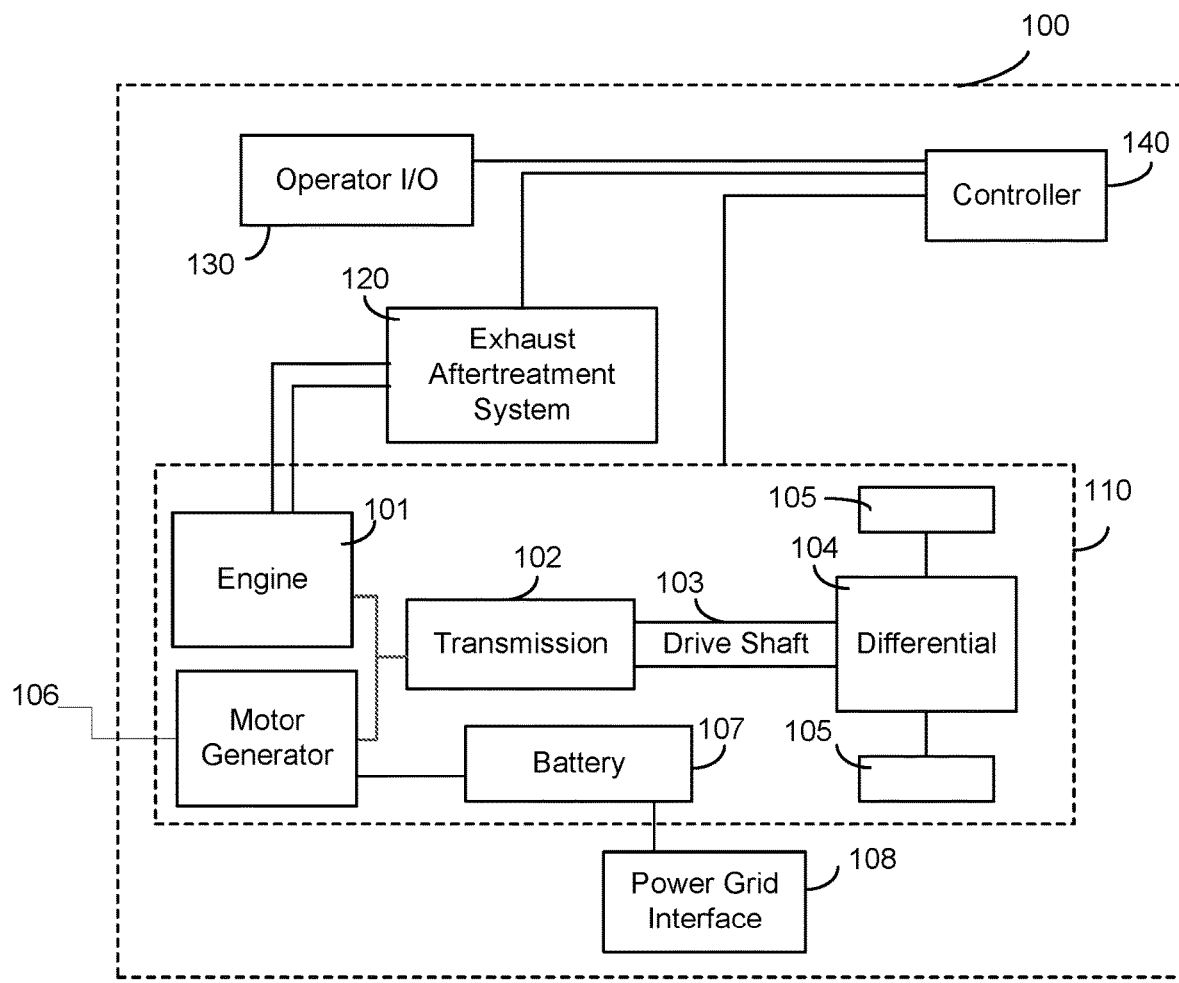
FIG. 1 is a schematic view of a block diagram of a vehicle, according to an example embodiment.

Following below are more detailed descriptions of various concepts related to, and implementations of, methods, apparatuses, and systems to adjust an engine operating point based on an emissions sensor feedback in a hybrid vehicle. Before turning to the Figures, which illustrate certain exemplary embodiments in detail, it should be understood that the present disclosure is not limited to the details or methodology set forth in the description or illustrated in the Figures.

It should also be understood that the terminology used herein is for the purpose of description only and should not be regarded as limiting.

Referring to the Figures generally, systems and methods for coordination between and control of operating points for an engine and an electric motor of a vehicle based on feedback from an emissions sensor of an exhaust aftertreatment system are shown and described herein according to various embodiments. Internal combustion engines produce or emit exhaust gas (i.e., emissions), which can contain environmentally harmful compounds such as nitrous oxides (NOx), particulate matter (PM), carbon monoxide (CO), sulfur oxides (SOx), greenhouse gases, and so on. The amount of the emitted environmentally harmful gases may be referred to as an "emissions level" herein. The emissions level can be higher due to fault conditions in both the engine and aftertreatment systems, along with the aging of various components within those systems (e.g., selective catalytic reduction systems, etc.). When catalysts age, their efficacy for reducing harmful exhaust gases such as NOx to nitrogen and water may be diminished.

According to the present disclosure, a system, method, and apparatus is disclosed for adjusting engine and electric motor operating points in order to reduce an emissions level output. A system out emissions sensor, such as a NOx sensor, is positioned at or near an outlet point for emissions from an engine-exhaust aftertreatment system (e.g., in the tailpipe). The system out (SO) emissions sensor is configured or structured to track certain emissions characteristics (e.g., NOx amount out, etc.). Based on this tracked data, a controller determines when a particular emissions level is higher than expected (exceeds a predefined threshold value). The operating point of the engine is adjusted by the controller to a desired level dependent on the tracked data (e.g., high NOx, high particulate matter, etc.) to reduce emissions. In combination, the controller adjusts operation of the electric motor to maintain vehicle power demands (e.g., a driver power demand for a maneuver). For instance and in some embodiments, in response to the emissions sensor acquiring data indicative of the emissions level being above the threshold, the engine load is adjusted (e.g., decreased) to adjust (e.g., decrease) combustion temperatures and reduce EONOx production. Concurrently or nearly concurrently, the controller increases a power output from the electric motor to compensate for the reduced engine power output to meet or substantially meet vehicle power demands (e.g., to be substantially unnoticeable to a driver/operator of the vehicle). The increase of power output of the electric motor may not be optimal from an electric flow standpoint (e.g., less state of charge than typically utilized for electric motor operation). However, this arrangement is beneficial for emissions output/efficiency and meeting emissions regulations. These and other features and benefits are described more fully herein below.

Referring now to FIG. 1, a vehicle 100 is shown, according to an example embodiment. The vehicle 100 includes a powertrain system 110, an aftertreatment system 120, an operator input/output (I/O) device 130, and a controller 140, where the controller 140 is communicably coupled to each of the aforementioned components. The vehicle 100 may be an on-road or an off-road vehicle including, but not limited to, line-haul trucks, mid-range trucks (e.g., pick-up trucks), tanks, airplanes, and other types of vehicle that utilize an exhaust aftertreatment system with an at least partially hybrid or electrified powertrain (e.g., electrical power to propel the vehicle may be provided by one or more electric power output devices, such as an electric motor). In the example shown, the vehicle 100 is a hybrid vehicle. In an alternate embodiment, the vehicle may be a stationary vehicle, such as a power generator or genset, that includes an electrified motor, internal combustion engine, and an exhaust aftertreatment system.

The powertrain system 110 is shown as an electrified powertrain system including an engine 101 and a motor generator 106, among other components. The powertrain system 110 facilitates power transfer from the engine 101 and/or motor generator 106 to power and/or propel the vehicle 100 (e.g., move the vehicle forward, backward, etc.). The powertrain system 110 includes the engine 101 and the motor generator 106 operably coupled to a transmission 102 that is operatively coupled to a drive shaft 103, which is operatively coupled to a differential 104, where the differential 104 transfers power output from the engine 101 and/or motor generator 106 to the final drive (shown as wheels 105) to propel the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor generator 106 may also be in a power receiving relationship with an energy source, such as the battery 107 that provides an input energy to output usable work or energy to in some instances propel the vehicle 100 alone or in combination with the engine 101. In this configuration, the hybrid vehicle has a parallel drive configuration. However, it should be understood, that other configurations of the vehicle 100 are intended to fall within the spirit and scope of the present disclosure (e.g., a series configuration, etc.). As a result of the power output from at least one of the engine 101 and/or the motor generator 106, the transmission 102 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105. The final drive 105 then propels or moves the vehicle 100.

The transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in a configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

The engine 101 is an internal combustion engine (e.g., compression-ignition or spark-ignition). Depending on the engine 101 structure, the engine 101 may be powered by various fuel types (e.g., diesel, ethanol, gasoline, etc.). The engine 101 includes one or more cylinders and associated pistons. In the example shown, the engine 101 is a diesel powered compression-ignition engine. Air from the atmosphere is combined with fuel, and combusted, to produce power for the vehicle. Combustion of the fuel and air in the compression chambers of the engine 101 produces exhaust gas that is operatively vented to an exhaust pipe and to the exhaust aftertreatment system. The engine 101 may be coupled to a turbocharger (not shown). The turbocharger includes a compressor coupled to an exhaust gas turbine via a connector shaft. Generally, hot exhaust gasses spin the turbine which rotates the shaft and in turn, the compressor, which draws air in. By compressing the air, more air can enter the cylinders, or combustion chamber, thus burning more fuel and increasing power and efficiency. A heat exchanger, such as a charge air cooler, may be used to cool the compressed air before the air enters the cylinders. In some embodiments, the turbocharger is omitted.

Although referred to as a "motor generator" 106 herein, thus implying its ability to operate as both a motor and a generator, it is contemplated that the motor generator component, in some embodiments, may be an electric generator separate from the electric motor (i.e., two separate components) or just an electric motor. Further, the number of electric motors or motor generators may vary in different configurations. The principles and features described herein are also applicable to these other configurations. Among other features, the motor generator 106 may include a torque assist feature, a regenerative braking energy capture ability, and a power generation ability (i.e., the generator aspect). In this regard, the motor generator 106 may generate a power output and drive the transmission 102. The motor generator 106 may include power conditioning devices such as an inverter and a motor controller, where the motor controller may be coupled to the controller 150. In other embodiments, the motor controller may be included with the controller 150.

The battery 107 may be configured as any type of rechargeable (i.e., primary) battery and of any size. In some embodiments, the battery 107 may be other electrical energy storing and providing devices, such as one or more capacitors (e.g., ultra-capacitors, etc.). In still other embodiments, the battery 107 may be a battery system that includes one or more rechargeable batteries and energy storing and providing devices (e.g., ultra-capacitors, etc.). The battery 107 may be one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 140 to provide data indicative of one or more operating conditions or parameters of the battery 107. The data may include a temperature of the battery, a current into or out of the battery, a number of charge-discharge cycles, a battery voltage, a state of charge (SOC), etc. As such, the battery 107 may include one or more sensors coupled to the battery 107 that acquire such data. In this regard, the sensors may include, but are not limited to, voltage sensors, current sensors, temperature sensors, etc.

The vehicle 100 may further include a power grid interface 108 coupled to the battery 107 and the motor generator 106 and configured to enable an electrical power transfer to the motor generator 106. The power grid interface 108 may connect the battery 107 to an electric power grid (not illustrated) to charge the battery 107. The power grid interface 108 may be configured as an interface for supplying energy to the battery 107 from an external power transmission source (e.g., generator, charging station, etc.). For example, a plug may be included with the vehicle that electrically couples the vehicle 100 to a charging source (i.e., a plug-in hybrid vehicle).

Figure 2:
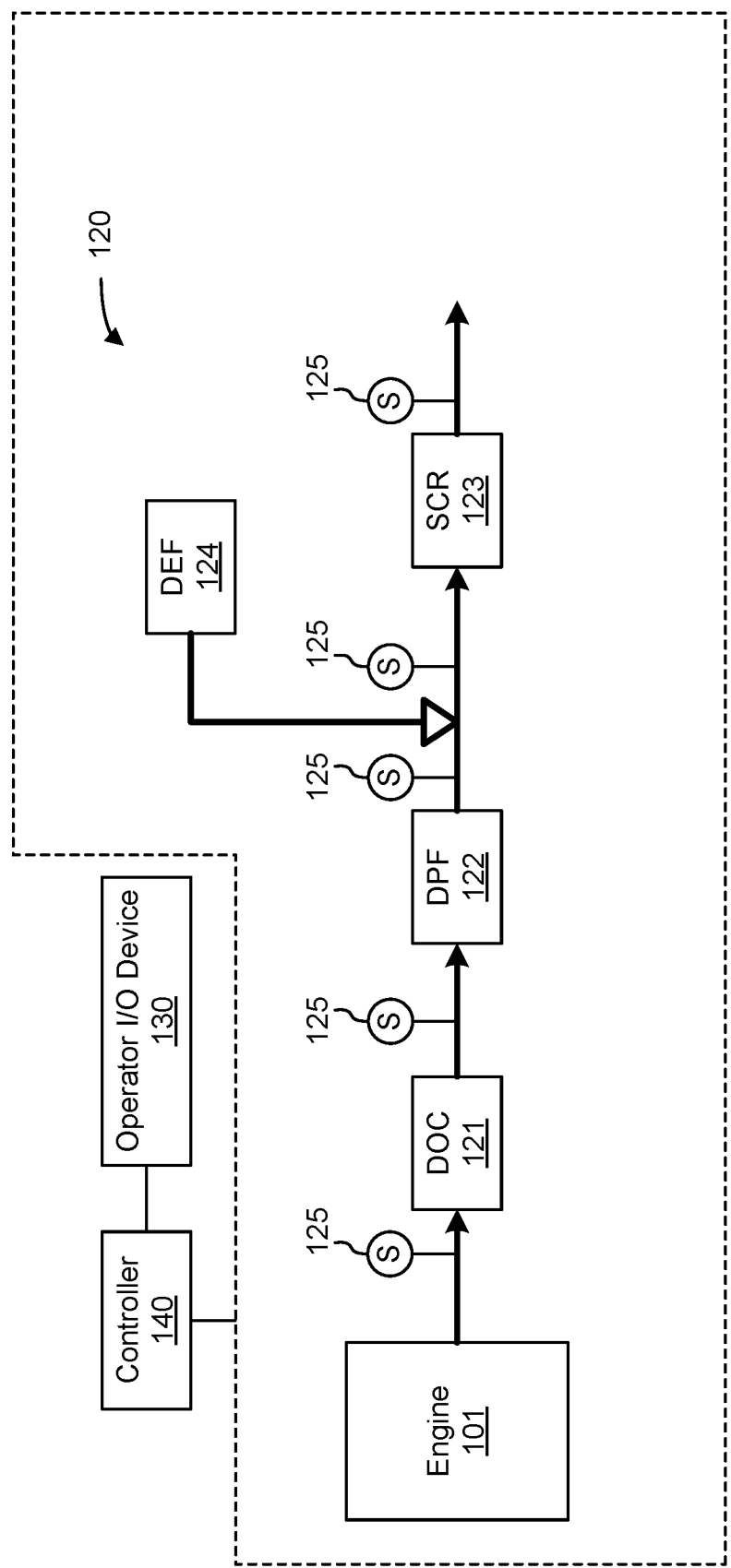
FIG. 2 is a schematic view of a block diagram of the aftertreatment system of the vehicle of FIG. 1, according to an example embodiment.

Referring now to FIGS. 1 and 2, the aftertreatment system 120 for the vehicle 100 is shown, according to an example embodiment. It should be understood that the schematic depicted in FIG. 2 is but one implementation of an engine exhaust aftertreatment system. Accordingly, it should be understood that the systems and methods of the present disclosure may be used in a variety configurations such that the embodiment depicted in FIG. 2 is not meant to be limiting.

The aftertreatment system 120 is coupled to the engine 101, and is structured to treat exhaust gases from the engine 101 in order to reduce the emissions of harmful or potentially harmful elements (e.g., NOx emissions, particulate matter, etc.). The aftertreatment system 120 is shown to include various components and systems, such as a diesel oxidation catalyst (DOC) 121, a diesel particulate filter (DPF) 122, and a selective catalytic reduction (SCR) system 123. The SCR 123 converts nitrogen oxides present in the exhaust gases produced by the engine 101 into diatomic nitrogen and water through oxidation within a catalyst. The DPF 122 is configured to remove particulate matter, such as soot, from exhaust gas flowing in the exhaust gas conduit system. In some implementations, the DPF 122 may be omitted. Also, the spatial and relative order of the catalyst elements may be different in other configurations.

The SCR catalyst operation can be affected by several factors. For example, the effectiveness of the SCR catalyst to reduce the NOx in the exhaust gas can be affected by the operating temperature. If the temperature of the SCR catalyst is below a threshold value or range, the effectiveness of the SCR catalyst in reducing NOx may be reduced below a desired threshold level, thereby increasing the risk of high NOx emissions into the environment. The SCR catalyst temperature can be below the threshold temperature under several conditions, such as, for example, during and immediately after engine startup, during cold environmental conditions, etc. Further, typically, higher combustion temperatures promote engine out NOx (EONOx) production. This is due to the rapid fire expansion from within the cylinder, which leads to the release of NOx. Increasing exhaust gas recirculation (EGR) leads to reduction in combustion temperatures, which reduces EONOx. However, EGR can promote particulate matter emissions due to incomplete combustion of particles. Additionally, higher loads and power demands also tend to increase combustion temperatures and, in turn, EONOx. Higher power output coincides with higher fueling pressures and quantity (increases in fuel rail pressure). In turn, increasing fueling pressures, quantity, etc. also tends to promote EONOx production.

Further, in hybrid systems that either use internal combustion engines for charging batteries or to provide power in conjunction with one or more electric motors, the internal combustion engine may start and stop at variable times, increasing the risk of low SCR catalyst operating temperatures. As a result, when the engine is started, the low temperature of the SCR catalyst can result in high NOx emission levels. While the SCR catalyst temperature may progressively increase once the engine is running after startup, until that time, the exhaust gas can include an undesirable amount of NOx. The effectiveness of the SCR catalyst can also be affected by faults in the SCR system that indicate, for example, a lack of reductant, a build-up on the SCR catalyst, a sustained conversion efficiency below a predefined value (e.g., a NOx conversion efficiency, etc.

The aftertreatment system 120 may include a reductant delivery system which may include a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. A diesel exhaust fluid (DEF) 124 is added to the exhaust gas stream to aid in the catalytic reduction. The reductant may be injected by an injector upstream of the SCR catalyst member such that the SCR catalyst member receives a mixture of the reductant and exhaust gas. The reductant droplets undergo the processes of evaporation, thermolysis, and hydrolysis to form non-NO$_x$ emissions (e.g., gaseous ammonia, etc.) within the decomposition chamber, the SCR catalyst member, and/or the exhaust gas conduit system, which leaves the aftertreatment system 120. The aftertreatment system 120 may further include an oxidation catalyst (e.g., the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is between approximately 200 degrees C. and 500 degrees C. In other embodiments, the certain operating temperature is the temperature at which the conversion efficiency of the DOC 121 exceeds a predefined threshold value.

The aftertreatment system 120 may further include a Lean NOx Trap (LNT) and/or a three-way catalyst (TWC) (or another catalytic converter). The LNT may act to reduce NOx emissions from a lean burn internal combustion engine by means of adsorption. Among other potential functions and features, the TWC may function to manage emissions from rich-burn engines while providing optimal performance with minimal cleaning or maintenance. Utilizing a flow-through substrate coated with a precious metal catalyst, the chemical oxidation process may convert engine out emissions into harmless nitrogen, carbon dioxide and water vapor as the gas passes through the catalytic converter (e.g., three-way catalyst).

As shown, a plurality of sensors 125 are included in the aftertreatment system 120. The number, placement, and type of sensors included in the aftertreatment system 120 is shown for example purposes only. In other configurations, the number, placement, and type of sensors may differ. The sensors 125 may be NOx sensors, temperature sensors, particulate matter (PM) sensors, and/or other emissions-related sensors. The NOx sensors are structured to acquire data indicative of a NOx amount at each location that the NOx sensor is located (e.g., a concentration amount, such as parts per million). The NOx sensor may also measure or acquire data indicative of an oxygen concentration in the exhaust gas flowing by the sensor. The temperature sensors are structured to acquire data indicative of a temperature at their locations. The PM sensors are structured to monitor particulate matter flowing through the aftertreatment system 120.

The sensors 125 may be located after the engine 101 and before the aftertreatment system 120, after the aftertreatment system 120, and/or within the aftertreatment system (e.g., coupled to the DPF and/or DOC, coupled to the SCR, etc.). It should be understood that the location of the sensors may vary in other configurations. In one embodiment, there may be sensors 125 may located both before and after the aftertreatment system 120. In one embodiment, the sensors are structured as exhaust gas constituent sensors (e.g., CO, NOx, PM, SOx, etc. sensors). In another embodiment, the sensors 125 are structured as non-exhaust gas constituent sensors that are used to estimate exhaust gas emissions (e.g., temperature, flow rate, etc.).

Additional sensors may be also included with the vehicle 100. The sensors may include engine-related sensors (e.g., torque sensors, speed sensors, pressure sensors, flow rate sensors, temperature sensors, etc.). The sensors may further include motor generator-related sensors (e.g., a battery state of charge (SOC) sensor, a power output sensor, a voltage sensor, a current sensor, etc.). The additional sensors may still further include sensors associated with other components of the vehicle (e.g., speed sensor of a turbo charger, fuel quantity and injection rate sensor, fuel rail pressure sensor, etc.).

The sensors may be real or virtual (i.e., a non-physical sensor that is structured as program logic in the controller that makes various estimations or determinations based on received data). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 150 indicative of the speed of the engine 101. When structured as a virtual sensor, at least one input may be used by the controller 150 in an algorithm, model, look-up table, etc. to determine or estimate a parameter of the engine (e.g., power output, etc.). The other sensors may be real or virtual as well. As described herein, the sensors 125 and additional sensors may provide data regarding how the particular vehicle system is operating, and determine how to adjust operating points of the engine and/or motor/generator based on the sensor feedback.

The controller 140 is coupled to the engine and the electric motor, and a variety of other components, including the sensors 125 of the aftertreatment system 120. The controller 140 is structured to receive data from one more of the sensors 125 (i.e., emissions sensors) to monitor and determine whether the emissions level is at or above a predefined threshold. In response to the received data, the controller 140 may adjust the operating point(s) of the engine and the electric motor to meet driver demands yet reduce or mitigate harmful exhaust gas emissions. The controller 140 may further use the data for monitoring and diagnostic purposes. In some embodiments and based on the received data, the controller 140 may generate one or more fault codes (e.g., OBD codes, diagnostic trouble codes, malfunction indicator lamps/lights, and so on).

Referring still to FIGS. 1 and 2, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the vehicle 100 to communicate with the controller 140 and one or more components of the vehicle 100 of FIG. 1. For example, the operator input/output device 130 may include, but is not limited to, an interactive display, a touchscreen device, one or more buttons and switches, voice command receivers, etc. In various alternate embodiments as described above, the controller 140 and components described herein may be implemented with non-vehicular applications (e.g., a power generator with an electric motor). Accordingly, the I/O device may be specific to those applications. For example, in those instances, the I/O device may include a laptop computer, a tablet computer, a desktop computer, a phone, a watch, a personal digital assistant, etc. Via the operator I/O device, the controller 140 may provide diagnostic information, a fault or service notification based on one or more determinations. For example, in some embodiments, the controller 140 may display, via the operator I/O device, a temperature of the DOC 121, a temperature of the engine 101 and the exhaust gas, and various other information.

The controller 140 is structured to control, at least partly, the operation of the vehicle 100 and associated sub-systems, such as the powertrain system 110, the aftertreatment system 120 (and various components of each system), and so on. According to the example shown, the components of FIG. 1 are embodied in a vehicle. In various alternate embodiments, as described above, the controller 140 may be used with other engine system and/or any engine-exhaust aftertreatment system with an electric motor (e.g., a power generator with an electric motor). Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 3.

Figure 3:
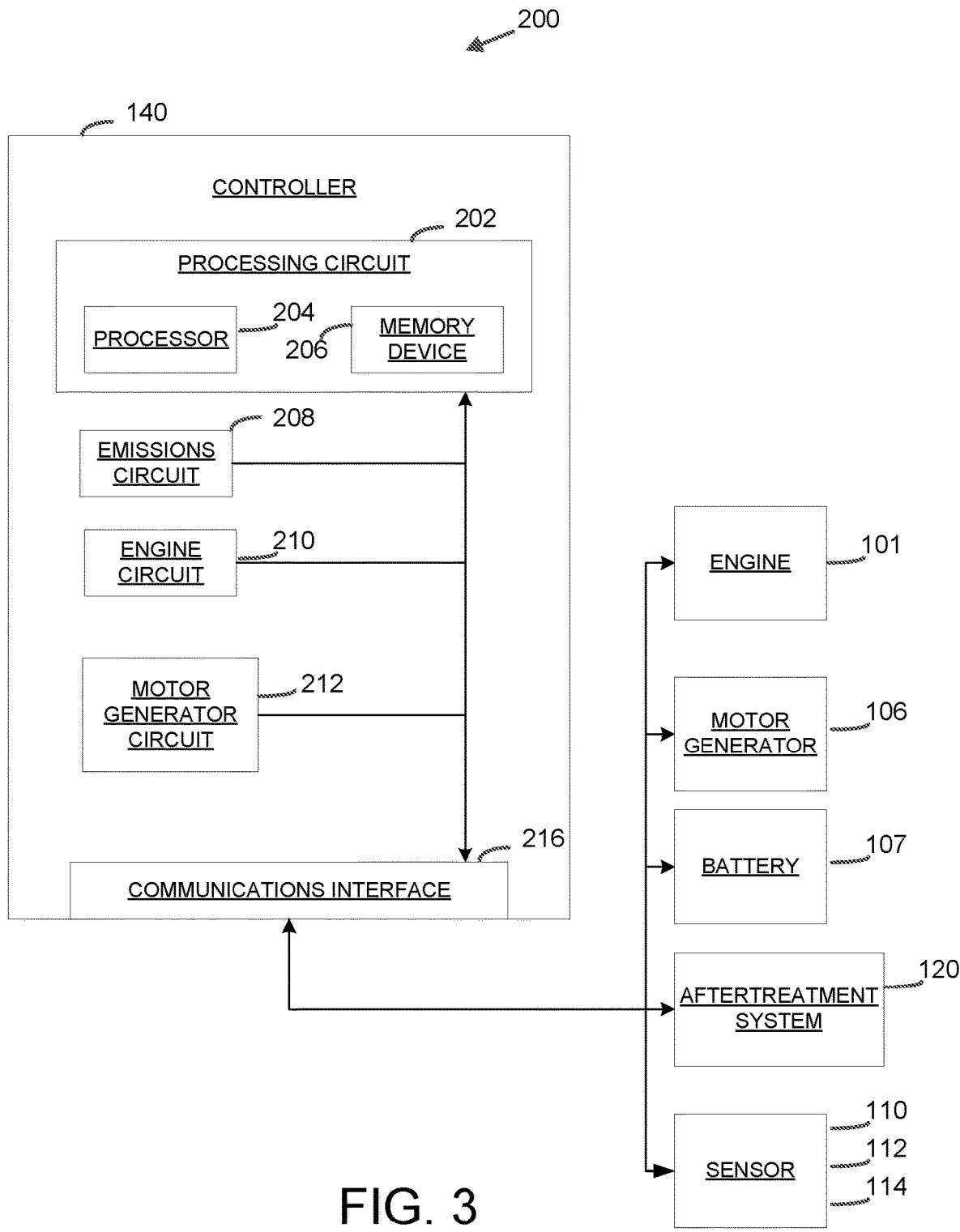
FIG. 3 is a block diagram of the controller of FIGS. 1-2, according to an example embodiment.

Referring now to FIG. 3, a schematic diagram 200 of the controller 140 of the vehicle 100 of FIG. 1 is shown according to an example embodiment. The controller 140 may be structured as one or more electronic control units (ECU). The controller 140 may be separate from or included with at least one of a transmission control unit, an exhaust aftertreatment control unit, a powertrain control module, an engine control module, etc. In one embodiment, the components of the controller 140 are combined into a single unit. In another embodiment, one or more of the components may be geographically dispersed throughout the system. All such variations are intended to fall within the scope of the disclosure. The controller 140 is shown to include a processing circuit 202 having a processor 204 and a memory device 206, an emissions circuit 208, an engine circuit 210, a motor generator circuit 212, and a communications interface 216.

In one configuration, the emissions circuit 208, engine circuit 210, and the motor generator circuit 212 are embodied as machine or computer-readable media storing instructions that are executable by a processor, such as processor 204. As described herein and amongst other uses, the instructions of the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include or store code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the emissions circuit 208, engine circuit 210, and the motor generator circuit 212 are embodied as hardware units, such as electronic control units. As such, the emissions circuit 208, engine circuit 210, and the motor generator circuit 212 may be embodied as one or more circuitry components including, but not limited to, processing circuitry, network interfaces, peripheral devices, input devices, output devices, sensors, etc. In some embodiments, the emissions circuit 208, engine circuit 210, and the motor generator circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the emissions circuit 208, engine circuit 210, and the motor generator circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The emissions circuit 208, engine circuit 210, and the motor generator circuit 212 may also include programmable hardware devices such as field programmable gate arrays, programmable array logic, programmable logic devices or the like. The emissions circuit 208, engine circuit 210, and the motor generator circuit 212 may include one or more memory devices for storing instructions that are executable by the processor(s) of the emissions circuit 208, engine circuit 210, and the motor generator circuit 212. The one or more memory devices and processor(s) may have the same definition as provided below with respect to the memory device 206 and processor 204. In some hardware unit configurations and as described above, the emissions circuit 208, engine circuit 210, and the motor generator circuit 212 may be geographically dispersed throughout separate locations in the system. Alternatively and as shown, the emissions circuit 208, engine circuit 210, and the motor generator circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the emissions circuit 208, engine circuit 210, and the motor generator circuit 212. The depicted configuration represents the emissions circuit 208, engine circuit 210, and the motor generator circuit 212 as machine or computer-readable media such that they may be stored and executed by the memory device 206. However, as mentioned above, this illustration is not meant to be limiting as the present disclosure contemplates other embodiments where the emissions circuit 208, engine circuit 210, and the motor generator circuit 212, or at least one circuit of the circuits the emissions circuit 208, engine circuit 210, and the motor generator circuit 212, is configured as a hardware unit. All such combinations and variations are intended to fall within the scope of the present disclosure.

The processor 204 may be implemented as one or more processors, an application specific integrated circuit (ASIC), one or more field programmable gate arrays (FPGAs), a digital signal processor (DSP), or other suitable electronic processing components. In some embodiments, the one or more processors may be shared by multiple circuits (e.g., the engine circuit 210 and the motor generator circuit 212 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data, logic, instructions, and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and, in some embodiments, out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

The communications interface 216 may facilitate communication between and among the controller 140 and one or more components of the vehicle 100 (e.g., the engine 101, the transmission 102, the aftertreatment system 120, the sensors 125, other sensors, etc.). Communication between and among the controller 140 and the components of the vehicle 100 may be via any number of wired or wireless connections (e.g., any standard under IEEE). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The emissions circuit 208 is structured to determine an emissions level based on emissions data from at least one sensor and, particularly, the aftertreatment sensor(s) 125. The emissions circuit 208 compares the determined emissions level to a predefined threshold, which is described below. Based on this comparison, a change in operation of at least one of the electric motor and engine occurs. The emissions level, as mentioned above, is the amount of an emitted exhaust gas constituent, and particularly an environmentally harmful constituent (e.g., NOx, PM, CO, SOx, greenhouse gases, etc.), from the engine. The emissions level may be determined at various locations (e.g., a system out amount such as downstream of the aftertreatment system, between the engine and the aftertreatment system such as an engine out value, within the aftertreament system, or some combination thereof). The emissions level may be based on emissions data acquired by the sensors 125 such that the emissions level is determined at or near the location of the sensors (e.g., at various locations within the engine 101 and/or aftertreatment system 120). For example, a sensor 125 may be a particulate matter (PM) sensor structured to determine or estimate the amount of particulate matter accumulated in the aftertreatment system 120. Particulate matter is caused by incomplete combustion whereby HC is emitted from the engine. As another example, a sensor 125 may be or also include a NOx sensor. The NOx sensor may acquire data indicative of an amount of NOx at the location of the sensor in the aftertreatment system 120. In other embodiments, a different exhaust gas constituent sensor may be utilized. While NOx and PM are described herein, it should be understood that similar processes may be utilized with other exhaust gas constituents depending on the sensor(s) utilized (e.g., greenhouse gases, SOx, etc.). Based on the aftertreatment system sensor 125 (real or virtual), the emissions circuit 208 may determine an emissions level.

The emissions circuit 208 may determine the emissions level regarding the exhaust gas constituent at a particular point in time or based on a plurality of sensor readings over a predefined period of time (e.g., a period of days, months, etc.). The emissions level may be determined based on emissions data from one or more sensors 125 positioned at various locations of the engine 101 and/or aftertreatment system 120 at various points in time of operation. For example, a system out emissions sensor, such as a NOx sensor, may be positioned at or near an outlet point of an engine-exhaust aftertreatment system (e.g., in the tailpipe) to determine the concentration amount of NOx (e.g., a concentration amount, such as parts per million) that is emitted into the environment at a particular time. In another embodiment, the emissions level may be determined at this position based on the average NOx amount over a predefined duration of time or after a predefined distance traveled by the vehicle (e.g., 100,000 miles). Based on the emissions data from the sensor 125, the controller determines whether the emissions level is at or above a predefined threshold. As described herein, based on the emissions level determination, the controller 140 adjusts an operating point(s) of the engine 101 and/or the motor generator 106.

In another embodiment and as shown in FIG. 2, there may be two or more sensors positioned throughout the aftertreatment system 120 (proximate the SCR, DPF, DOC, etc.) that are used to determine the emissions level by the emissions circuit 208. For example, two NOx sensors may be provided, such that one sensor is positioned upstream of the aftertreatment system 120 and a second sensor is positioned downstream of the aftertreatment system 120. One or more of the two NOx sensors may be virtual. As described above, a virtual sensor is a non-physical sensor that utilizes data from other sensor to determine or estimate a value, which in this case, is NOx. In one embodiment, both of the NOx sensors are virtual. In another embodiment, only one of the NOx sensors are virtual (e.g., upstream sensor or downstream sensor). In yet another embodiment, both of the NOx sensors are actual non-virtual sensors. Based on the readings/measurements from the two NOx sensors, in one embodiment, the emissions circuit 208 may utilize the higher NOx reading to determine an emissions level. Or, the emissions circuit 208 may compare the readings from each NOx sensor to a model (i.e., a predicted output) based on the operation of the engine or vehicle to determine which of the plurality of measurements is more accurate relative to the model. The emissions circuit 208 may then utilize the relatively more accurate NOx reading to determine the emissions level (e.g., at a particular point in time, as an average or other statistic (e.g., median) over a predefined period of time, etc.).

As mentioned above, in some embodiments, at least one of the sensors 125 may be a PM sensor positioned within the aftertreatment system (e.g., proximate the DPF). The PM sensor determines an amount of accumulated particulate matter in the aftertreatment system at a particular time at a particular location (the location of the PM sensor). The emissions circuit 208 may determine a PM emissions level based on a determined average PM amount over a predefined duration of time (e.g., average, median, etc.), a distance traveled of the vehicle (e.g., 100,00 miles), or at a particular time of operation of the vehicle. Based on the emissions data from the sensor (e.g., PM data), the controller determines whether the emissions level is at or above a predefined threshold.

In other embodiments, another sensor type may be used to estimate the PM in the aftertreatment system. For instance, an exhaust flow rate sensor may be positioned at an outlet of the DPF to provide data indicative of an exhaust flow rate through the DPF. When the exhaust gas flow rate is below a threshold value, the emissions circuit 208 may determine that the system is not operating as intended (e.g., there is a buildup of PM on the DPF that is adversely restricting the flow of exhaust gases). In another embodiment, there may be more than one exhaust gas flow rate sensor positioned within the aftertreatment system. For instance, there may be a flow rate sensor at an inlet and an outlet of the DPF, such that a difference in flow rate is determined based on data from the two sensors. The emissions circuit 208 may determine a reduced flow rate (i.e., an emissions level) that exceeds a desired or preset acceptable level (i.e., a predefined threshold for the emissions value) based on the difference between the DPF inlet and outlet. The emissions circuit 208 may determine a PM emissions level based on a determined or estimated exhaust gas flow rate from the exhaust gas flow rate sensor (e.g., flow rates that are lower than expected based on a comparison to a model or look-up table comprising experimental data may indicate PM build-ups in the system beyond an acceptable amount).

In another embodiment, at least one of the sensors 125 may be a $CO_2$ sensor positioned within or proximate to the aftertreatment system. The $CO_2$ sensor determines an amount of carbon dioxide in the exhaust gas at a particular time at a particular location (the location of the $CO_2$ sensor). The emissions circuit 208 may determine a $CO_2$ emissions level based on a determined average $CO_2$ amount over a predefined duration of time, an average or other statistic after a predefined amount of a distance traveled of the vehicle (e.g., 100,00 miles), or an instantaneous or nearly instantaneous amount at a particular time of operation of the vehicle. The $CO_2$ sensor may be a real or a virtual sensor. Further, multiple $CO_2$ sensor may be used to determine or estimate an emissions level regarding $CO_2$ from the system.

In yet another embodiment, at least one of the sensors 125 may be an ammonia (NH3) sensor structured to determine an amount of ammonia at its location. For example, an ammonia slip sensor may be disposed in the aftertreatment system that is structured to determine an amount of unreacted ammonia at a particular time (or over a predefined amount of time) from the dosing system. The emissions circuit 208 may determine an average amount of ammonia based on the ammonia sensor measurements over a predefined amount of time, distance traveled for the vehicle, or another unit of measurement. Multiple ammonia sensors may be included within the system, and the average, high, or other predefined value may be used to determine an ammonia emissions level. Based on the emissions data from the sensor (e.g., $CO_2$ data, NH3 data, etc.), the controller determines whether the emissions level is at or above a predefined threshold.

In other embodiments, the emissions circuit 208 may determine an emissions level based on sensor readings from multiple different aftertreatment system sensors 125. As shown in FIG. 2, there may be different types of sensors 125 located at various positions in the aftertreatment system 120. For instance, there may be a NOx sensor and a PM sensor positioned within the aftertreatment system proximate the SCR and DPF, respectively. There may also be an exhaust flow rate sensor at both an inlet and an outlet of the DPF, and a NOx sensor at the outlet of the aftertreatment system 120. These sensors may determine an emissions level as described above at a particular time, as an average rate over a predefined duration of time, and/or after a set period of time. Based on the determination of the sensors, the controller determines whether the emissions level is at or above a predefined threshold for one or more of these measurements or readings. The emissions circuit 208 may be programmed to favor the NOx sensor determination over the PM sensor determinations, for example. In yet another embodiment, the emissions circuit 208 is structured to utilize the reading that differs the most from the predefined threshold value, such as NOx being above a predefined acceptable NOx value more so than PM being above a predefined acceptable PM value. Thus, the sensors 125 may be used to determine an emissions level in a variety of different ways. As described herein, based on the emissions level determination, the controller 140 adjusts the engine 101 and/or the motor generator 106.

The emissions circuit 208 may receive or, in some embodiments, determine fault conditions with respect to the engine and associates systems (e.g., EGR, turbocharger, fuel system, etc.) and/or aftertreatment systems (e.g., indicating issues within the SCR, DOC, DPF, DEF dosing system, etc.). Accordingly, the emissions circuit 208 may receive or determine indicators regarding operation of the engine 101 and/or aftertreatment system 120 (e.g., onboard diagnostic codes, such as OBD codes, diagnostic trouble codes, fault codes, etc.). For example, the determined amount of ammonia from the ammonia slip sensor may indicate a particular fault condition with respect to the DEF dosing system (e.g., more ammonia is determined to be present in the system than what has been commanded). These indicators can be used by the emissions circuit 208 to determine potential statuses/conditions with respect to the components (e.g., health, whether the component is operating as intended, etc.). These indicators may be used to determine whether/how to adjust the operating point(s) of the motor generator and/or engine.

The emissions circuit 208 may further be configured to compare information from the sensors and the fault codes. For instance, there may be a fault code indicating the SCR is not operating as intended and simultaneously a reading from a NOx sensor indicating the NOx amount out exceeds a predefined threshold. Thus, a two-factor approach may be used (fault codes and sensor readings) to confirm that a reading, determination, or measurement of a sensor is likely correct. For example, if a sensor 125 is a NOx sensor that provides emissions data that exceeds an expected value by more than a threshold amount, rather than potentially determining an error with the sensor, the emissions circuit 208 examines a detected or determined fault condition(s). If there is a fault condition with the SCR, the emissions circuit 208 then determines that the NOx measurement, while higher than expected, is likely accurate given the fault or potential fault condition with the SCR. In this situation, the motor generator circuit 212 may command relatively more power output from the electric motor in certain situations in order to prevent high NOx emissions that may otherwise occur more frequently given the SCR fault. In another embodiment, the emissions circuit 208 provides a determined or received fault condition independent of sensor readings to the engine and motor generator circuit. In this situation, the operating points of the motor generator and engine may be controlled based on certain fault conditions to mitigate emissions of a certain exhaust gas constituent.

The emissions circuit 208 is structured to receive the emissions data to determine an emissions level (e.g., a transformation of the data to determine an amount of an exhaust gas constituent or the amount may be directly determined by the sensor) to a predefined threshold. The predefined threshold may correspond to the determined emissions level of the particular exhaust gas constituent (e.g., particulate matter, SOx, NOx, etc.). The predefined threshold may be a predefined value or an acceptable range of values for the particular exhaust constituent. The predefined value may be a preset value at the time of manufacturing that indicates an acceptable emissions level for a particular exhaust gas constituent (e.g., particulate matter, SOx, NOx, etc.). The predefined value may correspond to one or more emissions regulations (e.g., a NOx emissions regulations such as set by CARB). The predefined value may be dynamic in that the value changes as a function of location of the vehicle or time (e.g., updated as emissions regulations change and, via a telematics unit, the updated acceptable predefined value is transmitted to the controller 140). For example, different states may have different emissions requirements such that, for example, the acceptable NOx value may change from state-to-state and location data (e.g., GPS) changes the set point as the vehicle goes from state-to-state.

In some embodiments, the predefined threshold can be a calibrated threshold. In this regard, the emissions circuit 208 may utilize a model, algorithm, process, etc. that analyzes the changes of a certain emissions parameter (e.g., NOx output, PM, etc.) over a certain period of time. For example, the NOx emissions over the past six months may be average at X, and previous X-Y. Thus, the emissions circuit 208 may estimate or predict that the NOx emissions going forward will be X+Y. Accordingly, the threshold may change over time as the system evolves and changes. For example, the threshold may change when the age of the aftertreatment system or component thereof is above a threshold (e.g., lower than with a newer system or component). As another example, the threshold may change when a fault condition is detected or determined for the aftertreatment system or component thereof (e.g., lower than with a healthy system or component). By dynamically changing the threshold based on age and/or fault data, additional wear and tear from elevated emissions may be reduced. For example, the engine circuit may command relatively lower power output from the engine in more situations than normal (e.g., a lower power output than needed for a high load situation, such as a hill or towing a vehicle) and, instead, command an increase in power output from the electric motor. This control strategy functions to reduce the stress on the aftertreatment system until it can be serviced.

In another embodiment and as alluded to above, the emissions circuit 208 may utilize an age of a component to determine its efficacy, which may be used to control operation of the engine and/or electric motor. This may be similar to the usage of fault codes as described above. Or, as described above, the age data may be used to change the threshold for the emissions level. As a SCR ages, the SCR may become less effective at reducing NOx to nitrogen and water. As a result, if the catalyst has aged beyond a threshold value (even though there is not a fault code), the engine circuit 210 is configured to anticipate the lower efficiency/higher emissions and adjust the engine operating point accordingly (e.g., reduce power output during transient moments or in high load situations where NOx production is likely at elevated levels). To make up for vehicle power demands, the motor generator circuit may command an increase of power output from the electric motor. An aging model or look-up table may be stored by the emissions circuit 208 that correlates an operation parameter of the component (hours of operation, distance traveled, time since install or refurbish date, etc.) to an expected efficiency of that component. If the determined efficiency is below a threshold value, the emissions circuit 208 may determine that emissions will not be as good as expected given the age of the component. In certain configurations, the model or table may indicate how the component operates under certain conditions (e.g., loads beyond a threshold value, certain engine speed and torque combinations, etc.).

The engine circuit 210 is structured to communicate with and control, at least partly, the engine 101 based on feedback from the sensors 125. In particular, the engine circuit 210 is structured to control one or more operating points (speed, torque, etc.) of the engine 101 based on the comparison of the determined emissions level relative to the predefined threshold by the emissions circuit 208. The engine circuit 210 is structured to transmit a command to designate a desired operating point of the engine 101 (e.g., a target torque and/or speed output) in response to data/information from the sensors 125 (e.g., certain emissions being at or above a predefined threshold). The engine circuit 210 may command an air-handling actuator, a turbocharger position, an EGR position (e.g., the EGR valve), etc. For instance, the emission gases in the exhaust stream move from the exhaust side of the turbocharger to the aftertreatment system. As such, changing the turbine speed of the turbocharger may change the efficiency of the turbocharger, thus effecting the power per engine cycle and the emissions output.

The engine circuit 210 may also be coupled to fueling system to control, for example, a fuel rail pressure and other fueling commands for the engine (e.g., quantity and amount of fuel injected). The commands may be determined based on the emissions level relative to the predefined threshold. For example, the engine circuit 210 may be coupled to a fuel injector and associated actuators. The engine circuit 210 may provide a command to open the fuel injector and for a predefined duration to inject fuel into an associated cylinder of the engine 101.

In one embodiment wherein the system out NOx sensors acquire data indicative of a NOx amount and/or an oxygen concentration in the exhaust gas, the controller may command the engine circuit 210 to reduce the engine speed when the NOx emissions are at or above the predefined threshold in order to reach a target engine out NOx level. As described herein, higher combustion temperatures promote EONOx production. Increasing EGR leads to reduction in combustion temperatures, which reduces EONOx. As such, the engine circuit 210 modulates the engine operating point, specifically the power output from the engine in response to the emission level being at or above the predefined threshold. The engine operating point command may be a command to control an engine torque (e.g., a desired torque output), an engine speed (a desired engine speed), a fueling command (e.g., injector quantity and timing), an exhaust gas recirculation amount, combinations thereof, and so on. Higher loads and power demands tend to increase combustion temperatures and, in turn, EONOx. Higher power output coincides with higher fueling pressures and quantity (increases in fuel rail pressure). In turn, increasing fueling pressures, quantity, etc. also tends to promote EONOx production. Therefore, reducing engine power output of the engine 101 by the engine circuit 210 may reduce, in this case, NOx emissions.

As another example, a system out NOx sensor may acquire data indicative of a system out NOx being at or above a predefined threshold amount and the engine circuit commands increases the engine speed and torque. The higher speed and torque promotes higher exhaust gas temperatures which may raise a SCR catalyst temperature. If the temperature of the SCR catalyst is below a threshold value or range, the effectiveness of the SCR catalyst in reducing NOx may be reduced. As such, the engine circuit 210 modulates the engine operating point, to increase the engine power output of the engine 101 to increase the exhaust gas temperature to promote higher activity of the SCR catalyst and reduce NOx emissions.

In another embodiment wherein the PM sensors acquire data indicative of an accumulated amount of PM, the controller may command the engine circuit 210 to reduce the engine speed when the accumulated PM is at or above the predefined threshold. As described herein, particulate matter is caused, at least partly, by incomplete combustion. While increasing exhaust gas recirculation (EGR) leads to reduction in combustion temperatures, which reduces EONOx, EGR can promote particulate matter emissions due to incomplete combustion of particles. Thus, the engine circuit 210 may reduce the power output to reduce combustion temperatures and reduce reliance on EGR to, in turn, reduce PM production.

As yet another example, the $CO_2$ sensor(s) may acquire data indicative of an amount of carbon dioxide in the exhaust gas. Based on the $CO_2$ amount being above a predefined threshold, the controller may adjust one or more engine operating points to improve engine brake thermal efficiency (BTE) to in turn reduce $CO_2$ emissions. BTE may be defined as a ratio of brake power to thermal power from fuel (e.g., BTE increases as the engine does more work per an amount of fuel consumed). $CO_2$ may be based on the carbon content of a fuel and result from, at least partly, incomplete combustion. As such, the engine circuit 210 may increase the power output relative to a certain fuel input to increase power consumption per unit of fuel to increase BTE and decrease $CO_2$ production. The controller may store one or more BTE maps such that the controller may readily adjust the BTE from to affect $CO_2$ emissions. Concurrently or nearly concurrently, the power output from the electric motor may be decreased such that vehicle power demand is substantially maintained.

In another embodiment, the controller may command the engine circuit 210 based on one or more generated fault codes or conditions (e.g., DTCs). As described herein, there may be a fault code indicating the SCR is not operating as intended. In this situation, the engine circuit 210 may decrease the power output of the engine 101 to prevent high NOx emissions. Thus, the engine circuit 210 operates to take into account fault conditions (e.g., an aged catalyst, a fault code with an SCR catalyst or DPF, and so on). The controller 140 may then command additional power output from the motor generator to accommodate driver or vehicle power demands. For example, the controller may increase the power output from the electric motor when a high load that exceeds a predefined value is exceed is encountered (e.g., on a hill, towing a vehicle, etc.) and/or when a transient increase in load is experienced (e.g., in a passing event on a highway, etc.). High load situations typically increase in exhaust gas temperatures to increase catalytic activity. However, if a fault code or other error condition is present in the aftertreatment system, then the effectiveness of the aftertreatment system may be diminished even in these conditions. But, high load situations indicate heightened driver demands. Therefore, the controller 140 increases the power output from the electric motor to meet the driver demands. Thus, the driver does not experience a change in performance but the emissions (e.g., NOx) are actively addressed and mitigated.

The motor generator circuit 212 is structured to communicate with and control, at least partly, the motor generator 106. For instance, the motor generator circuit 212 sends a command to designate the desired power output (e.g., current, voltage) when the sensors 125 provide information indicative of the emissions being at or above a threshold (i.e., an emissions level, such as NOx, being above a threshold acceptable NOx value). As described herein, the command may be based on the engine circuit 210. For instance, the engine circuit 210 may communicate with the motor generator circuit 212 to send a command when the operating point of the engine 101 is adjusted. The motor generator circuit 212 adjusts the motor generator 106 according to the adjustment made to the engine 101 to compensate for the desired power output and driver power demands (i.e., the motor generator circuit 212 controls an electric motor in response to the adjustment of the engine to compensate for a change in power from the engine to reduce the emissions level to below the predefined threshold). A "change in power" may refer to an increase or decrease in power demand (e.g., torque, speed) that exceeds a predefined value relative to the current power demand (e.g., an absolute amount such as 10 horsepower or a percentage value, such as twenty percent). In another example, the "change in power" may change as a function of the current power output. In this regard, at relative lower power outputs, the "change in power" may be a relatively lower value (e.g., 10 horsepower) whereas at higher power outputs, the spike may be a different value (e.g., 10+X horsepower). In some embodiments, the "change in power" may be based on a torque or speed value alone, and not a power output amount. In any event, and in some embodiments, the "change in power" value may not be a constant value. In other embodiments, the change in power output is a constant value. While primarily described herein as a reduction in a change of power output (e.g., from the engine), it should be understood that increases are also contemplated by the present disclosure (e.g., a power increase may correspond to better emissions than a power decrease). As the power output capabilities of vehicles may vary, the "change in power" for one vehicle may differ relative to another vehicle. Thus, the motor generator circuit 212 and the engine circuit 210 may operate together to control emissions from the system based on the determined emissions level from the emissions circuit 208.

In some embodiments, the motor generator circuit 212 may increase the power output from the motor generator 106 to make up the power lost from the engine 101. For instance, when the controller reduces the power output from the engine 101, the motor generator circuit 212 increases the power output from the motor generator 106 to meet driver demands. For instance, if the driver is on a highway at the time the sensors 125 indicate an emissions level (e.g., NOx) exceeding a threshold that has been adjusted lower due to a SCR a fault code, the power needs to be increased to meet driver demands and maintain speed, so more power from the electric motor is commanded. Advantageously, by reducing the power output from the engine 101, the engine out NOx is reduced, which likely reduces system out NOx.

In some embodiments, the target operating point may require the engine 101 to produce more torque or power to increase exhaust gas temperature to promote catalytic activity, to burn off build-up for a regeneration event, etc. Thus, in this case, the optimal power output from the engine 101 may be an increase in power output (e.g., to heat up exhaust gas temperatures to promote catalytic activity). This is not typical operation due to the increase in fueling required for the increase in power output (i.e., worse fuel economy). To maintain driver demands, the controller 140 may determine the current power output before the increase in power output from the engine 101. In turn, controller 140 commands the motor generator 106 to produce less power to meet or substantially meet the previous current power demand. Thus, the electric motor is providing the difference in power out from the increase (or, in some situations, decrease) of power output from the engine 101. The optimal power split is dependent on the optimal efficiency point in reducing emissions. For example, the emissions level may be in relation to a NOx output amount. When the NOx amount is below the predefined threshold, the optimal power split may focus on reducing fuel consumption and CO2. Thus, in this situation, NOx is important in determining how emissions are controlled even when the NOx amount is below the threshold. It is important to note that the controller 140 is configured to prioritize reducing emissions in contrast to a typical balance of power output between the engine 101 and the motor generator. For instance, to meet driver power demands, it may be more efficient in light of the stored electrical power to continue commanding a majority of the power from the engine, however reducing the emissions output is prioritized and thus the controller 140 may demand a reduction of power output from the engine 101 an increase in power output from the motor generator 106 to, for example, reduce particulate matter emissions.

The motor generator circuit 212 may also be structured to receive or acquire data regarding the battery 107 (i.e., the SOC) to control the motor generator 106 and battery 107. The motor generator circuit 212 is structured to manage the usage of electrical energy from the battery 107 to provide the necessary power to the motor generator 106. For example, when the engine circuit 210 decreases dependence on the engine 101 to have lower combustion temperatures, the SOC is measured to determine what demands may be provided by electric motor 106 to shift reliance from the engine 101 to the motor generator 106 thereby decreasing NOx production. For instance, the NOx emissions levels may exceed the predefined threshold or a fault code is active with respect to SCR that indicates that the SCR is not operating effectively. Accordingly, to reduce NOx emissions, more power from the motor generator 106 may be provided than from the engine 101. But, the SOC may be below a predefined threshold value for typical operation for commanding a power output from the electric motor. In contrast to typical operation, the motor generator circuit 212 commands a power output from the electric motor and shifts reliance from the engine 101 to the motor generator 106 to reduce NOx missions. In this regard, the motor generator circuit 212 is configured to negate the predefined SOC threshold for providing a power output from the electric motor if the emissions level exceeds a higher predefined emissions level. A concern is with the emissions output, not feasibility of electrical power storage.

As such, the motor generator circuit 212 may communicate with the engine circuit 210 based on the SOC of the battery 107. For example, the motor generator circuit 212 may determine whether there is enough charge to use the battery 107 at a certain power output and for how long. If the battery 107 does not have enough power stored to compensate for a reduction in power from the engine 101, then the engine circuit 210 commands the engine 101 to remain operating at its current point. Although the engine circuit 210 and the motor generator circuit 212 are structured to alter the commands to the engine 101 and the motor generator 106 based on the various levels of the vehicle 100 (e.g., fuel level, SOC), adjusting the engine 101 to achieve optimal efficiency for reduced emission is prioritized. In other words, the increase or decrease of the engine 101 is determined first and operation of the motor generator 106 is adjusted to compensate for the change in power output from the engine based on the engine operating point command. Further, in some embodiments, there may be an excess amount of energy produced when the torque and speed of the engine 101 is increased and the motor generator 106 is decreased. The excess energy may be used to charge the battery 107 by the motor generator circuit 212.

The motor generator circuit 212 and engine circuit 210 control the electric motor and engine 101 to reduce the emissions level to below the predefined threshold. In this regard, the determine power split and output from the engine and electric motor may continue until the emissions level is predefined threshold or in response to a driver power demand that overrides the implemented power split. The aftertreatment sensors 125 may continue to provide data (e.g., feedback data) to monitor the emissions level until the emissions level is below the predefined threshold.

Figure 4:
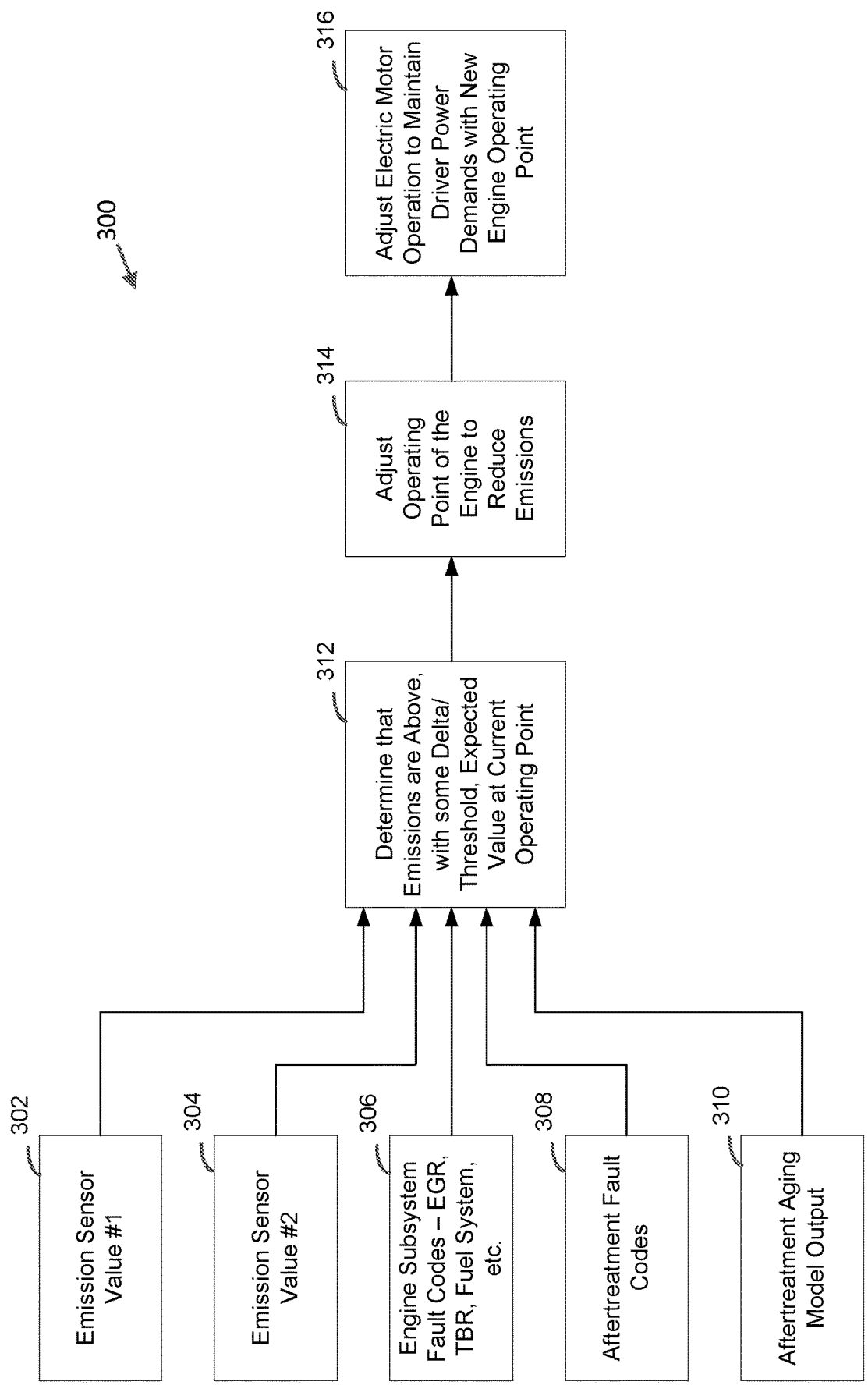
FIG. 4 is a flow diagram of a method of controlling the vehicle of FIG. 1, according to an example embodiment.

Referring now to FIG. 4, a method 300 for adjusting the operating point of the engine to reduce an emissions level is shown, according to an exemplary embodiment. The method may be performed by the components of FIGS. 1-3, such that reference may be made to them to aid explanation of the method 300.

At processes 302 and 304, a signal indicative of an emissions level is received. As described herein, the sensors 125 may acquire emissions data indicative of an emissions level. The sensors 125 that are used to determine emissions level may be one or more exhaust gas constituent sensors such as NOx sensors, PM sensors, or other exhaust gas constituent sensors. The sensor may be positioned upstream or downstream the aftertreatment system 120, or within the aftertreatment system 120. In some embodiments, the sensors 125 may be other sensors types not that are not specific exhaust gas constituent sensors (e.g., temperature sensors, flow rate sensors, etc.). In this situation, a look up table, algorithm, model, or other process may be used to correlate a detected parameter (e.g., exhaust gas flow rate, temperature, etc.) to a level of exhaust gas constituent to determine an emissions level for that constituent. The sensors 125 communicate an emissions level to the controller 140, upon which the controller 140 determines whether the emissions level is at or above a predefined threshold, at process 312. The predefined threshold may correspond to the determined emissions level of the particular exhaust gas constituent (e.g., particulate matter, SOx, NOx, etc.). The predefined threshold may be a predefined value or an acceptable range of values for the particular exhaust constituent. Optionally, the controller 140 may receive a signal or determine a fault condition for an engine subsystem fault code at process 306 (e.g., fuel system, etc.), an aftertreatment system fault code at process 308, and/or determine an age of the aftertreatment system or a component thereof at process 310. The fault codes and the model output may determine how well the aftertreatment system components are working or how the engine components are effecting exhaust emissions. As described above, these outputs may be used by the controller 140 to at least one of adjust/control the predefined threshold or estimate the emissions level with respect to one or more exhaust gas constituents. In turn, the controller 140 determines whether the emissions level is at or above a predefined threshold at process 312. For instance, if the emissions levels are high, a fault code may be generated indicating the SCR or the doser may not be operating effectively. The fault code is used to determine an effect on emissions or adjust the predefined threshold. An error code for the SCR may indicate that the SCR cannot reduce NOx. This may be compounded at cold start. Thus, at cold start, for example, more reliance on the motor generator 106 is utilized as the engine 101 is gradually warmed up to reduce NOx emissions. Further, in embodiments wherein a turbocharger is provided, the turbocharger increases the efficiency of an internal combustion engine and power output by forcing extra compressed air into the combustion chamber. A fault code indicating an error in the turbocharger may similarly indicate an effect on the emissions level. For instance, if the turbocharger is not operating as intended, the efficiency of the engine is effected and thus, the emissions output may increase or otherwise not provide expected results.

The aftertreatment aging model may be a model which analyzes the changes over a certain period of time to predict expected operation of components of the aftertreatment system over that time. The model may observe trends in the efficiency and performance of various aftertreatment components to predict when the vehicle will be operating at a certain efficiency level. For instance, if the SCR efficiency is decreasing at a certain rate, the model may provide an indication regarding whether the efficiency will be below a predefined threshold and how much time before that occurs. The aftertreatment aging model may utilize a look up table. For instance, the aftertreatment aging model can correlate miles, time, age, etc. to the efficiency of that unit (e.g., the SCR). For instance, at 500,000 miles and at the current power output band, it can be determined that the SCR is behaving 30% as effectively than as it would be when it was brand new. Based on the determination that the SCR is operating less efficiently (e.g., 30% less) under similar conditions, the controller can determine that there will be a corresponding increase (e.g., 30% more) emissions. The model may be stored by the emissions circuit 208. Alternatively, the emissions circuit 208 may receive information over a network to determine an age of the aftertreatment system or component thereof (e.g., via the Internet).

At process 314, a command from the controller 140 to control of the engine 101 is provided to adjust the operating point of the engine to reduce emissions based on the comparison of the emissions level to the predefined threshold. For example, if the emission level is above the predefined threshold, this may indicate non-compliance for certain emissions regulations (e.g., NOx above a regulated threshold value). As such and based on this determination, the engine circuit 210 commands and adjusts the operating point of the engine. As discussed herein, the adjustment may include increasing or decreasing the power output of the engine 101. For instance, higher combustion temperatures promotes NOx production, so to reduce emissions (e.g., NOx, particulate matter) the system 100 may reduce reliance on the engine 101 in favor of more power from the motor generator 106. Alternatively, increasing power output from the engine 101 may lead to higher exhaust gas temperatures which heats ups the SCR to promote catalytic activity and reduce NOx emissions. Here, the engine circuit 210 functions to control the engine operating point (e.g., increasing or decreasing a power output) to optimize emissions (e.g., produce less of, for example, engine out NOx) even if adjusting the engine operating point in this manner may result in some sacrifice in performance.

At process 316, a command to control of the motor generator 106 is provided by the controller 140 to adjust electric motor operation to maintain (i.e., meet or substantially meet) driver or vehicle power demands based on the adjusted engine operating point. For example, if the power output of the engine 101 is decreased via the engine circuit 210, the motor generator circuit 212 adjusts the motor generator 106 to increase power output in response to the new engine operating point, and thus maintain driver power demands. As another example, if the power output of the engine 101 is increased via the engine circuit 210 because an increase in power output corresponds to a decrease in emissions, the motor generator circuit 212 adjusts the motor generator 106 to decrease power output in response to the new engine operating. In some embodiments, the excess power from the electric motor may be diverted to the battery to charge the battery. In other embodiments, the excess power from the electric motor may be diverted to the other devices, such as an electric exhaust heater (or, a battery or other electrical storage device). The heater may be any sort of external heat source that can be structured to increase the temperature of passing exhaust gas, which, in turn, increases the temperature of components in the aftertreatment system 120, such as the DOC or the SCR. As such, the heater may be an electric heater, a grid heater, a heater within the SCR, an induction heater, a microwave, or a fuel-burning (e.g., HC fuel) heater. In this example, the heater is an electric heater that draws power from the motor generator 106. Alternative to heating the exhaust gas, the heater may be positioned proximate a desired component to heat the component (e.g., DPF) by conduction (and possibly convection). Multiple heaters may be used with the exhaust aftertreatment system, and each may be structured the same or differently (e.g., conduction, convection, etc.). Further, the controller may control operating characteristics of the heater, such as full power on, partial power on, intermittently turning the heater on/off, and so on.

The motor generator circuit 212 may command continued use/power output from the motor generator 106 until driver demands necessitate a change in power split or until the emissions level are below the predefined threshold. For instance, if the driver is idling or driving at a high, efficient speed (e.g., on a highway) and driver demands are already being met, the motor generator circuit 212 may not shift power output from the motor generator 106. Further, if the driver demands increase (e.g., accelerating to pass, accelerating from a stop to a start, etc.), the motor generator circuit 212 may communicate with the engine circuit 210 to alternate the power output yet still function to reduce the emissions level to below the predefined threshold.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A "coupled" to circuit B may signify that the circuit A communicates directly with circuit B (i.e., no intermediary) or communicates indirectly with circuit B (e.g., through one or more intermediaries).

While circuits with particular functionality is shown in FIG. 3, it should be understood that the controller 140 may include any number of circuits for completing the functions described herein. For example, the activities and functionalities of the emissions circuit 208, engine circuit 210 and the motor generator circuit 212 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium storing instructions for execution by various types of processors, such as the processor 204. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
an exhaust aftertreatment system coupled to an engine;
at least one sensor coupled to the aftertreatment system; and
a controller comprising at least one processor coupled to at least one memory device storing instructions that, when executed by the at least one processor, cause the controller to perform operations including:
receive emissions data from the at least one sensor regarding exhaust gas from the engine;
determine that an emissions level is at or above a predefined threshold based on the received emissions data;
adjust an operating point of the engine in response to the emissions level being at or above the predefined threshold and based on a fault code regarding an exhaust gas recirculation system, a turbocharger, a fuel system, or a component of the system to reduce the emissions level; and
control an electric motor in response to the adjustment of the engine to compensate for a change in power output from the engine to assist in reducing the emissions level to below the predefined threshold.

2. The system of claim 1, wherein the controller performs further operations including decreasing a power output from the electric motor to meet or substantially meet a vehicle power demand.

3. The system of claim 1, wherein the controller performs further operations including diverting excess electrical energy to a battery or other device coupled to the electric motor.

4. The system of claim 1, wherein the operating point is at least one of a torque of the engine, a speed of the engine, or a fueling command for the engine.

5. The system of claim 1, wherein the change in power output is an increase or a decrease that exceeds a predefined value relative to a current power demand to assist in reducing the emissions to below the predefined threshold.

6. The system of claim 1, wherein a brake thermal efficiency of the engine is increased in response to the emissions level being at or above the predefined threshold, and a power output of the electric motor is decreased to meet a vehicle power demand.

7. The system of claim 1, wherein the operating point of the engine is increased in response to the emissions level being at or above the predefined threshold to increase a temperature of an exhaust aftertreatment system component or of exhaust gas from the engine, and a power output of the electric motor is decreased to maintain a vehicle power demand.

8. A system for a hybrid vehicle, the system comprising:
a controller coupled to an electrified powertrain and to at least one sensor disposed in an exhaust aftertreatment system of the hybrid vehicle, the controller structured to:
receive emissions data from at least one sensor regarding exhaust gas from an engine;
determine that an emissions level is at or above a predefined threshold based on the received emissions data;
adjust an operating point of an engine of the electrified powertrain in response to the emissions level being at or above the predefined threshold and based on a fault code regarding the exhaust aftertreatment system; and
control an electric motor of the electrified powertrain in response to the adjustment of the engine to compensate for a change in power output from the engine to reduce the emissions level to below the predefined threshold.

9. The system of claim 8, wherein the change in power output is an increase or a decrease that exceeds a predefined value relative to a current power demand to reduce the emissions to below the predefined threshold.

10. The system of claim 8, wherein the controller decreases the operating point of the engine in response to the emissions level being at or above the predefined threshold to decrease combustion temperatures, and increases a power output of the electric motor to meet or substantially meet a hybrid vehicle power demand.

11. The system of claim 8, wherein the controller increases the operating point of the engine in response to the emissions level being at or above a predefined threshold to increase a temperature of an exhaust aftertreatment system component or of exhaust gas from the engine, and decreases a power output of the electric motor to meet or substantially meet a hybrid vehicle power demand.

12. The system of claim 8, wherein the controller is further structured to increase a power output from the electric motor in response to a battery state of charge (SOC) that supplies electrical power to the electric motor being below a predefined threshold.

13. A method, comprising:
receiving, by a controller, emissions data regarding an emissions level of a hybrid vehicle having an exhaust aftertreatment system from a sensor;
determining, by the controller, that the emissions level is at or above a predefined threshold;
adjusting, by the controller, an operating point of an engine of the hybrid vehicle based on the emissions level being at or above the predefined threshold and based on a fault code regarding the exhaust aftertreatment system; and
controlling, by the controller, an elector motor in response to the adjustment of the operating point of the engine to compensate for a change in power output from the engine and to reduce the emissions level to below the predefined threshold.

14. The method of claim 13, further comprising: adjusting, by the controller, the predefined threshold based on the fault code regarding the exhaust aftertreatment system; and, increasing, by the controller, a power output from the electric motor to meet or substantially meet a hybrid vehicle power demand and reduce the emissions level to below the predefined threshold.

15. The method of claim 13, wherein the change in power output is an increase or a decrease in power output that exceeds a predefined value relative to a current power demand, and wherein the sensor is positioned in between the engine and the exhaust aftertreatment system.

16. The method of claim 13, further comprising decreasing, by the controller, the operating point of the engine in response to the emissions level being at or above the predefined threshold to decrease combustion temperatures, and increasing, by the controller, a power output of the electric motor to meet or substantially meet a hybrid vehicle power demand.

17. The method of claim 13, further comprising increasing, by the controller, the operating point of the engine in response to the emissions level being at or above the predefined threshold to increase an SCR catalyst temperature; and decreasing, by the controller, a power output of the electric motor to meet or substantially meet a hybrid vehicle power demand.

18. The method of claim 13, wherein the sensor is positioned after the exhaust aftertreatment system to acquire data regarding system out emissions, or wherein the sensor includes a first sensor and a second sensor, wherein the first sensor is positioned between the engine and the exhaust aftertreatment system and the second sensor is positioned downstream of the exhaust aftertreatment system.

* * * * *